United States Patent
Barnett et al.

[11] Patent Number: 5,871,178
[45] Date of Patent: Feb. 16, 1999

[54] DECOMPRESSION PANEL FOR AIRCRAFT PARTITION

[75] Inventors: Gregory H. Barnett, Costa Mesa; Thomas J. Nagle, Canyon Lake; Hyo S. Shim, Cerritos, all of Calif.

[73] Assignee: McDonnell Douglas Corporation, Huntington Beach, Calif.

[21] Appl. No.: 722,608

[22] Filed: Sep. 27, 1996

[51] Int. Cl.$^6$ .................................................. B64D 25/00
[52] U.S. Cl. ..................................... 244/118.5; 244/129.1
[58] Field of Search ........................... 244/129.5, 118.1, 244/118.5, 129.1, 129.4, 1 R, 121; 220/89 A, 203; 292/259, 19; 52/98, 1; 137/68 R, 70

[56] References Cited

U.S. PATENT DOCUMENTS

| | | |
|---|---|---|
| 3,571,977 | 3/1971 | Abeel .................................... 244/129.1 |
| 4,033,247 | 7/1977 | Murphy . |
| 4,390,152 | 6/1983 | Jorgensen . |
| 4,432,514 | 2/1984 | Brandon . |
| 4,646,993 | 3/1987 | Baetke . |
| 4,709,884 | 12/1987 | Gustafson ............................... 244/139 |
| 4,899,960 | 2/1990 | Hararat-Tehrani et al. . |
| 5,069,401 | 12/1991 | Shepherd et al. . |
| 5,085,017 | 2/1992 | Hararat-Tehrani . |
| 5,118,053 | 6/1992 | Singh et al. . |
| 5,137,231 | 8/1992 | Boss . |

*Primary Examiner*—Galen L. Barefoot
*Attorney, Agent, or Firm*—Harness Dickey & Pierce P.L.C.

[57] ABSTRACT

A decompression panel assembly for use in a partition of an aircraft is disclosed. The decompression panel assembly includes a panel member that fits over a decompression vent opening in a partition. The panel member includes multiple holes. The same number of cover plates are positioned to cover the holes and are held in place by retainer elements. The retainer elements are made from a thin gauged metal material and secure the cover plates over the holes. Several retaining spring clips are positioned about the perimeter of the panel member and secure the decompression panel assembly against the partition to cover the decompression vent opening.

17 Claims, 2 Drawing Sheets

DECOMPRESSION PANEL FOR AIRCRAFT PARTITION

BACKGROUND OF THE INVENTION

1. Technical Field

The present invention relates to a decompression panel for use in a partitioning device in an aircraft, such as a wall section or an intermediate floor section.

2. Discussion

It is well-known that many aircraft fly at altitudes where the outside atmospheric pressure is noticeably less than the atmospheric pressure at ground level. These aircraft are often, if not always, equipped to pressurize the aircraft to provide for an air pressure within the aircraft that corresponds substantially to the atmospheric pressure at ground level. As a consequence, a pressure differential exists across the aircraft fuselage wall between the pressurized aircraft and the prevailing atmospheric pressure at altitude. Furthermore, the higher the altitude, the greater the pressure differential between the interior of the aircraft fuselage and the outside environment. These conditions give rise to the possibility that a sudden decompression of an explosive nature may occur in the aircraft due to a breach of the aircraft fuselage, particularly when the aircraft is flying at an altitude in which the atmospheric pressure is significantly lower than atmospheric pressure at ground level.

In addition, the aircraft are often subdivided into separate compartments within the fuselage by partitioning structures such as intermediate walls and floors or ceilings. These partitioning devices, for example, may separate the interior of the aircraft into a passenger compartment and a cargo compartment. Also, the cargo compartment may be further subdivided and sealed with additional partitioning devices.

Because there exists the possibility of a rapid decompression of the aircraft passenger and/or cargo compartments to atmosphere when flying at altitude, the aircraft must be equipped with a means for equalizing the pressure between these subdivided compartments in order to prevent structural damage to the partitioning devices as well as the aircraft. For example, if a rapid decompression occurs in the cargo compartment, it is desirable to prevent very sudden differential pressure between the passenger compartment (still pressurized) and the lower cargo compartment (suddenly depressurized). Therefore, it is common practice to provide for a particular pressure equalization system in order to avoid the destruction of the partitioning device that separates the passenger and cargo compartments, as well as any installation mounted in or on the partitioning device, potentially including even aircraft controls systems.

Well-known pressure compensating systems use relatively large decompression vent openings in the partitioning structures between the separated compartments. These decompression vent openings are closed-off by removable decompression panels.

Conventionally, such decompression panels are held in the decompression vent openings by detachable mounting elements that release the panel in response to a decompression situation in order to clear the decompression vent opening. When the pressure differential is sufficiently large, these conventional decompression panels either break-off or are ejected from the decompression vent opening to thereby allow a rapid equalization of pressure. Common problems associated with these conventional decompression panels include the inability for the decompression panel to provide for a positive, air tight seal between the partitioned compartments while not subject to a decompression situation.

It is therefore an object of the present invention to provide a decompression panel for an aircraft partition that provides a positive seal under normal conditions while still meeting all rapid decompression system requirements. It is another object of the present invention to provide such a decompression panel for an aircraft that can be retrofit to accommodate decompression vent openings in existing aircraft.

SUMMARY OF THE INVENTION

Accordingly, a decompression panel assembly for use in a partition of an aircraft having at least one decompression vent opening is disclosed as comprising a panel member that is sized and shaped to cover the decompression vent opening and which includes multiple holes therethrough. The same number of cover plates, sized and shaped to cover the holes, are positioned to cover the holes and are held in place by retainer elements. The retainer elements are made from a thin-gauged metal material and are secured to the panel member, over the cover plates to prevent the cover plates from becoming dislodged from covering the holes under normal (non-decompression) conditions. Several retaining spring clips are positioned about the perimeter of the panel member and secure the decompression panel assembly against the partition to cover the decompression vent opening.

Under rapid decompression conditions, the decompression panel assembly is operable to equalize the pressure across the partition under two scenarios. First, in the event of a decompression across the partition in a first direction, the entire decompression panel assembly is dislodged from covering the decompression vent opening when the latching force of the retaining spring clips is overcome by the decompression force. The decompression panel assembly is also operable in the event of a decompression in a second, opposite direction. In this case, the first retainer elements fracture under the decompression force thereby enabling the cover plates to become dislodged from covering holes in the panel member. In each scenario, air flow is allowed across the partition to enable the pressure in the adjoining compartments to be equalized.

BRIEF DESCRIPTION OF THE DRAWINGS

The various advantages of the present invention will become apparent to one skilled in the art upon reading the following specification, in which:

FIG. 4a is an enlarged detail view illustrating a left side view of the retaining spring clip used with the decompression panel shown in FIG. 3;

FIG. 4b is a front view of the retaining spring clip of FIG. 4a;

DESCRIPTION OF THE PREFERRED EMBODIMENT

It should be understood from the outset that while the following discussion illustrates particular embodiments of the present invention, these embodiments merely represent a best mode of currently practicing the invention and other modifications may be made to the particular embodiments without departing from the spirit and scope of the invention.

Figure 1:
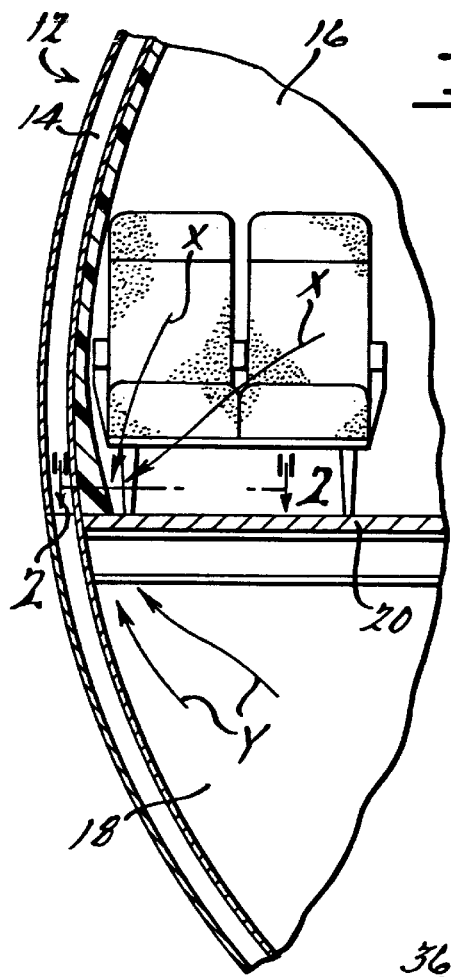
FIG. 1 illustrates a partial elevational cross-sectional view of a portion of the fuselage of an aircraft incorporating the decompression panel of the present invention.
Figure 2:
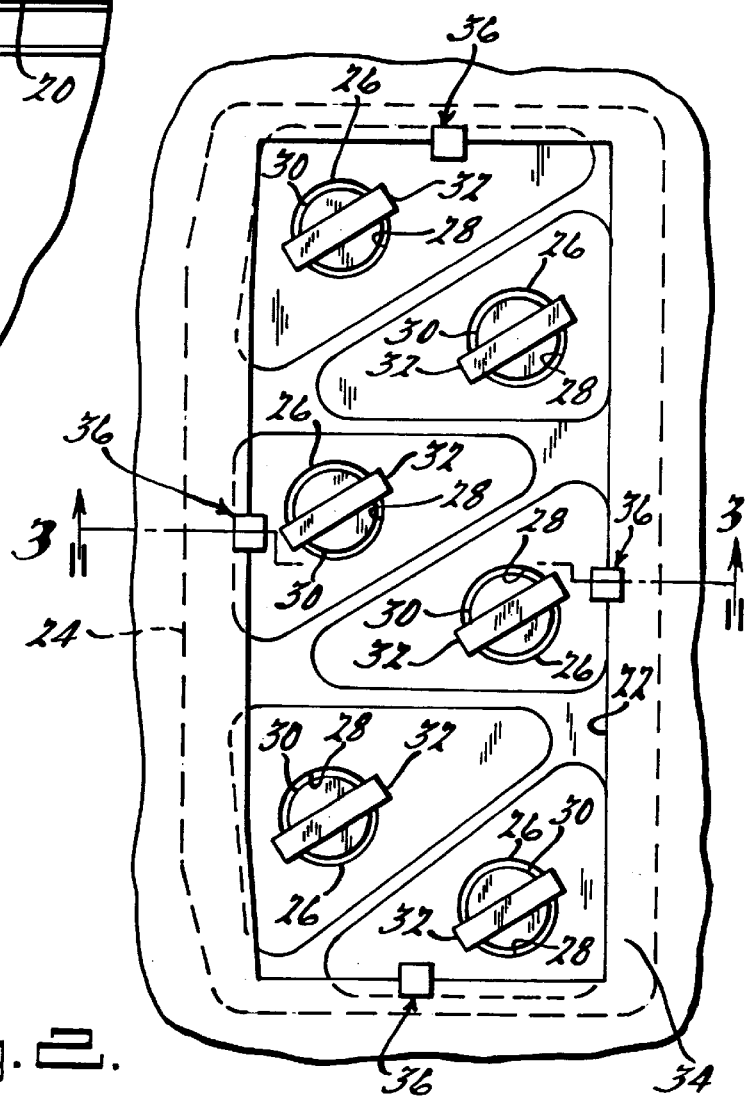
FIG. 2 shows a plan view of the decompression panel of the present invention taken along line 2—2 of FIG. 1.
Figure 3:
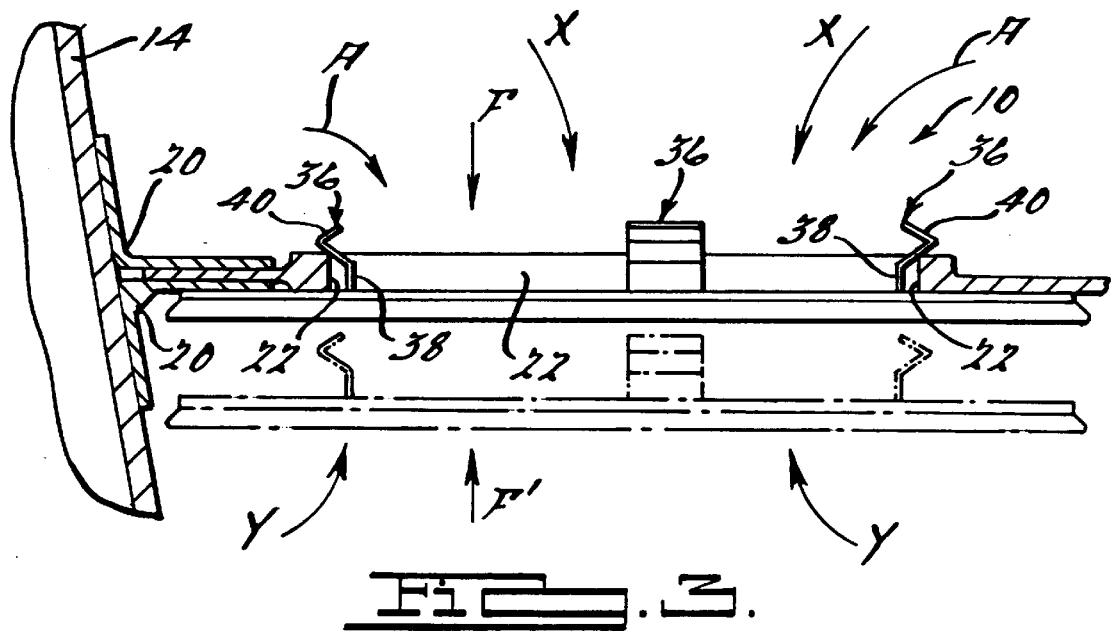
FIG. 3 is a partial cross-sectional view of the decompression panel of the present invention taken along line 3—3 of FIG. 2.

Referring now to the drawings, in FIGS. 1–4 a decompression panel assembly 10 for use in an aircraft partition constructed according to the teachings and principles of the present invention is shown and described. A cross-sectional portion of an aircraft fuselage 12 is illustrated in FIG. 1 as generally including a fuselage wall 14, an upper passenger compartment or cabin 16, an adjoining lower cargo compartment 18, and an intermediate floor partition, or cabin floor 20, which separates the passenger compartment 16 from the cargo compartment 18. The cabin floor 20 is equipped with many decompression vent openings 22 along the length of the fuselage 12 to enable air to flow between the passenger compartment 16 and the adjoining cargo compartment 18 in the event of a rapid decompression of the aircraft due to a breach in the aircraft fuselage 12. One such decompression vent opening 22 is best illustrated in FIGS. 2 and 3.

The decompression panel assembly 10 of the present invention is installed within the decompression vent opening 22. The decompression panel assembly 10 comprises a panel member 24 that is sized and shaped appropriately to adequately cover the decompression vent opening 22. In the preferred embodiment as shown in FIG. 2, the panel member 24 is generally rectangular in shape. The panel member 24 includes a plurality of apertures or openings 26, each of which has an inner lip 28 extending about the perimeter of the aperture 26. Set into each aperture 26 and supported by the lip 28 is a cover plate 30 that is sized and shaped to cap the aperture 26. Secured to the panel member 24 over each cover plate 30 is a retainer element 32 which prevents the cover plate 30 from becoming dislodged from covering the aperture 26 under normal (not rapid decompression) conditions in the aircraft.

The decompression panel assembly 10 is mounted in the decompression vent opening 22 beneath the cabin floor 20 from the direction of the cargo compartment 18. Positioned about the perimeter of the panel member 24 and between the panel member 24 and the cabin floor 20 is a gasket or other seal member 34 to effectuate an airtight seal between the decompression panel assembly 10 and the decompression vent opening 22 under normal conditions in the aircraft.

Figures 4A, 4B:
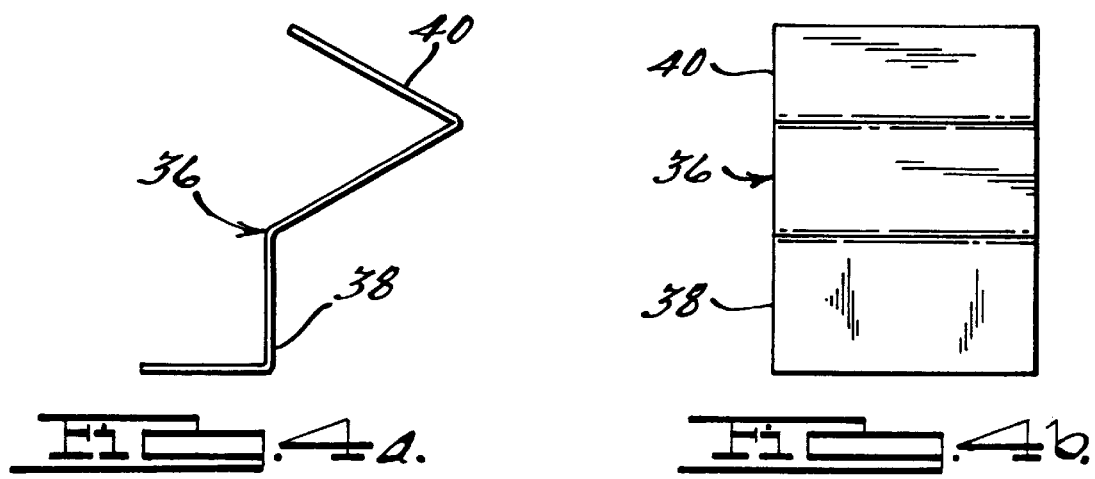
Figures 5A, 5B:
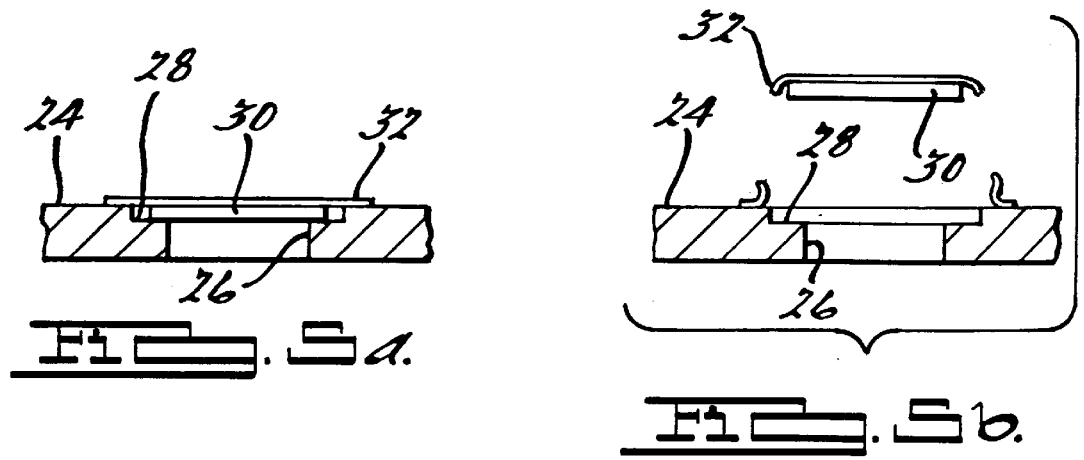
FIG. 5a is a partial cross-sectional view of a portion of the decompression panel of the present invention showing a cover plate positioned within an aperture and secured by a retainer element taken along line 5—5 of FIG. 2.
FIG. 5b illustrates the operation of the decompression panel of the present invention in one decompression scenario where the cover plate is dislodged from its position in the aperture of the decompression panel.

Retaining spring clips 36 are positioned at a plurality of locations about the perimeter of the panel member 24 and bias the decompression panel assembly 10 into place against the underside of the cabin floor 20 to cover the decompression vent opening 22, as shown in FIGS. 2 and 3. FIGS. 4a and 4b illustrate a preferred embodiment of a retaining spring clip 36. The retaining spring clip 36 is shown as having a lower L-shaped leg portion 38 and an upper "elbow" portion 40. The leg portion 38 of the retaining spring clip 36 is attached to the panel member 24 by any suitable fastening means. The elbow portion 40 of the retaining spring clip 36 is operable to seat against the edge of the decompression vent opening 22 and bias the decompression panel assembly 10 into place when the decompression panel assembly 10 is positioned within the decompression vent opening 22.

It is contemplated that the components of the decompression panel assembly 10 can be constructed of readily known and available materials. For example, the panel member 24 and cover plates 30 can be stamped from a lightweight sheet metal, molded from a thermoplastic material, or formed from a composite material. The retainer elements 32 can be manufactured from a thin gauge metal material, such as a steel or aluminum foil or tape. Also, the retaining spring clips 36 can be formed from a spring steel, thermoplastic or other suitable material. The gasket 34 can be made from materials like rubber, teflon or the like.

In operation, the decompression panel assembly 10 is intended to accommodate two different decompression scenarios, namely, blow-in decompression and blow-out decompression. Blow-in decompression refers to the decompression experienced in the event of a breach of the aircraft fuselage wall beneath the structure of the passenger compartment floor, such as in the cargo compartment 18. Arrows X show the direction of airflow experienced during a blow-in decompression. Blow-out decompression is encountered in the event of a breach of the aircraft fuselage wall in the passenger compartment 16. Arrows Y show the direction of airflow in during a blow-out decompression.

In the event of blow-in decompression, where there has been a breach in the aircraft fuselage wall at the cargo compartment 18, a rapid loss of pressure in that compartment is experienced creating a pressure differential across the cabin floor 20 between the high pressure passenger compartment 16 and the now low pressure cargo compartment 18. This pressure differential generates a decompression force against the decompression panel assembly 10 in the direction of arrow F, which tends to push the decompression panel assembly 10 toward the cargo compartment 18. The decompression force F acts upon the retaining spring clips 36 in order to flex them inwardly toward the center of the decompression vent opening 22, as generally indicated by arrows A. As the biasing of the retaining spring clips 36 is completely overcome, the elbow portions 40 of the retaining spring clips 36 become unseated from the edge of the decompression vent opening 22. Consequently, the decompression panel assembly 10 is forced from and thereby clears the decompression vent opening 22 enabling air to pass from the passenger compartment 16 to the cargo compartment 18 and equalize the pressure within the fuselage 12 of the aircraft.

Similarly, in the case of a blow-out decompression, the decompression panel assembly 10 acts to enable the flow of air between the passenger 16 and cargo 18 compartments to equalize pressure. Under this scenario, the decompression force is in the direction of arrow F'. As a result, the decompression panel assembly 10 is caused to be forced into place and seat tighter against the cabin floor 20. However, the cover plates 30, which close the apertures 26 and rest on the lips 28 about the apertures, are also forced upward in the direction of arrow F'. As such, the cover plates 30 are caused to press against the retainer elements 32. The decompression force F' is sufficient to cause the retainer elements 32 to fracture, shear or bend to allow the cover plates 30 to become dislodged from covering the apertures 26, thereby opening the apertures 26 and enabling air to pass from the cargo compartment 18 into the passenger compartment 16 to equalize the pressure within the fuselage 12 of the aircraft.

The present invention is inexpensive to manufacture and can be easily retrofit into rapid decompression systems of existing aircraft. Because there are numerous decompression vent openings 22 in the fuselage 12 of a single aircraft, such as a passenger airliner, and as many decompression panel assemblies 10 are required to cover all of the decompression vent openings 22, significant cost savings can be obtained with the present invention.

Various other advantages and modifications will become apparent to one skilled in the art after having the benefit of studying the teachings of the specification, the drawings, and the following claims.

What is claimed is:

1. A decompression panel assembly for use in a partition of an aircraft having at least one decompression vent opening therein, said decompression panel assembly comprising:
   a panel member, said panel member being sized and shaped to cover said decompression vent opening, said panel member including a plurality of apertures therein;
   a plurality of cover plates sized and shaped to cover said apertures in said panel member, each said cover plate being positioned to cover one of said apertures;
   a plurality of first retaining elements secured to said panel member for preventing said cover plates from becoming dislodged from covering said apertures;
   a plurality of second retaining elements for biasing said decompression panel assembly against said partition to cover said decompression vent opening, each of said second retaining elements having a first end and a second end, said first end being adapted to engage an edge portion of said panel member adjacent a first side of said partition and said second end being adapted to engage an edge portion of a second side of said decompression vent opening;
   a seal member located about the perimeter of said panel member in between said panel member and said partition; and
   whereby each said second retaining element deforms, without breaking, in response to a predetermined pressure differential across said panel member to allow said panel member to be released from said decompression vent opening.

2. The decompression panel assembly of claim 1 wherein said first end of each said second retaining element comprises an L-shaped portion fastened to said panel member and said second end comprises an upper portion operable to seat against said decompression vent opening and bias said decompression panel assembly in position over said decompression vent opening.

3. The decompression panel assembly of claim 1 wherein each of said plurality of first retainer elements is made from a fracturable, thin gauge metal material.

4. The decompression panel assembly of claim 1 wherein said apertures and said cover plates are generally circular in shape.

5. The decompression panel assembly of claim 1 wherein each said aperture comprises a lip upon which said one of said cover plates is positioned when covering each said aperture.

6. A decompression panel assembly for use in a partition of an aircraft having at least one decompression vent opening, said decompression panel assembly comprising a panel member being sized and shaped to cover said decompression vent opening and having a plurality of apertures, a plurality of cover plates sized and shaped to cover said apertures, each said cover plate being positioned to cover said aperture, a plurality of first retaining elements secured to said panel member for preventing said cover plates from becoming dislodged from covering said apertures, and a plurality of second retaining elements for biasing said panel member against said partition to cover said decompression vent opening, each said second retaining element having a first end and a second end, said first end being adapted to engage said panel member adjacent a first side of said partition and said second end adapted to engage a second side of said partition, and wherein said decompression panel assembly is operable to equalize the pressure across said partition in the event of a decompression force in a first direction by said second retaining elements deforming without breaking, sufficiently to permit said decompression panel assembly to be dislodged from said decompression vent opening, and in the event of a decompression force in a second direction by said first retainer elements fracturing to permit said cover plates to be dislodged from said apertures.

7. The decompression panel assembly of claim 6 further comprising a seal member located about the perimeter of said panel member in between said panel member and said partition.

8. The decompression panel assembly of claim 6 wherein said first end of each said second retaining element comprises a lower L-shaped portion fastened to said panel member and said second end comprises an upper portion operable to seat against said decompression vent opening and bias said decompression panel assembly in position over said decompression vent opening.

9. The decompression panel assembly of claim 6 wherein said apertures are generally circular in shape.

10. The decompression panel assembly of claim 6 wherein each of said plurality of first retainer elements is made from a fracturable, thin gauge metal material.

11. The decompression panel assembly of claim 6 wherein each said aperture comprises a lip upon which said cover plates are positioned when being positioned to cover said aperture.

12. A decompression panel assembly for use in a partition of an aircraft having at least one decompression vent opening therein, said decompression panel assembly comprising:
   a panel member, said panel member being sized and shaped to cover said decompression vent opening, said panel member including a plurality of apertures therein;
   a plurality of cover plates sized and shaped to cover said apertures in said panel member, each said cover plate being positioned to cover said aperture;
   a plurality of first retaining elements secured to said panel member for preventing said cover plates from becoming dislodged from covering said apertures;
   a plurality of second retaining elements for biasing said decompression panel assembly against said partition to cover said decompression vent opening, each of said second retaining elements having a first end and a second end, said first end being adapted to engage an edge portion of said panel member adjacent a first side of said partition and said second end adapted to engage said vent opening adjacent a second side of said partition; and wherein
   said decompression panel assembly is operable to equalize the pressure across said partition by enabling air to flow through said decompression vent opening in the event of a decompression in a first direction by said second retaining elements being deformed sufficiently, without breaking, in response to said pressure to enable said entire said decompression panel assembly to be dislodged from said decompression vent opening, and wherein in the event of a decompression in a second direction said first retaining elements being adapted to fracture in response to said pressure to enable said cover plates to be dislodged from said apertures.

13. The decompression panel assembly of claim 12 further comprising a seal member located about the perimeter of said panel member in between said panel member and said partition.

14. The decompression panel assembly of claim 12 wherein said first end of each said second retaining element comprises a lower L-shaped portion fastened to said panel member and wherein said second end comprises an upper portion operable to seat against said decompression vent opening and bias said decompression panel assembly in position over said decompression vent opening.

15. The decompression panel assembly of claim 12 wherein said apertures are generally circular in shape.

16. The decompression panel assembly of claim 12 wherein each of said plurality of first retainer elements is made from a fracturable, thin gauge metal material.

17. The decompression panel assembly of claim 12 wherein each said aperture comprises a lip upon which said cover plates are when positioned to cover said aperture.

\* \* \* \* \*